Aug. 7, 1962 G. S. JAMES Re. 25,215

AUTOMATIC PROTECTIVE DEVICE

Original Filed March 6, 1958

INVENTOR.
GLEN S. JAMES
BY Reif and Gregory
ATTORNEYS.

United States Patent Office

Re. 25,215
Reissued Aug. 7, 1962

25,215
AUTOMATIC PROTECTIVE DEVICE

Glen S. James, Excelsior, Minn.

Original No. 2,932,382, dated Apr. 12, 1960, Ser. No. 719,546, Mar. 6, 1958. Application for reissue Sept. 26, 1960, Ser. No. 58,588
6 Claims. (Cl. 198—232)

Matter enclosed in heavy brackets [ ] appears in the original patent but forms no part of this reissue specification; matter printed in italics indicates the additions made by reissue.

This invention is related to an automatic equipment protective device and particularly to a device adapted for equipment requiring the use of conveyor belts.

It is not uncommon for an unexpected stoppage of such belts to occur. Materials or goods carried by such belts often become lodged causing such stoppage. This is particularly true where materials or goods may be passed from one belt to another. It is common for such belts to be motor driven. Unless such stoppage is detected quickly, the motor or motors driving said belts soon become overloaded and overheated and as a result become seriously damaged. Thus there results not only the expense of repairing the damage to one or more motors as the case may be, but also a substantial expense is incurred in the shut down of the operation of the equipment involved.

It is an object of this invention therefore to have some means for quickly giving an alarm or a suitable noticeable signal of some kind when a stoppage of equipment such as conveyor belts occurs. Further it is desirable for the driving means of the equipment to be stopped at once before damage can occur. More especially it is desirable to have the supply of power to said driving means cut off automatically the instant of the occurrence of the stoppage.

It is also an object of this invention to have cooperation between the equipment involved and the applicant's device such that adequate power is generated to control the signal mechanism whereby the signal will operate automatically the instant a stoppage in the operation of equipment occurs.

It is a further object of this invention to have cooperation between the operation of the equipment involved and applicant's device to control the supply of power provided for such operation whereby a stoppage of equipment such as of a conveyor belt will automatically cut off said supply of power and whereby a cooperative relationship is established between said equipment and applicant's device to provide an independent supply of current to effect said control.

It is another object of this invention to have means actuated by a moving part of the equipment so as to be oscillated whereby in connection with other suitable means an electric current is generated for energizing and actuating a relay in circuit with said means, said relay controlling an electrical signal device whereby said signal device is adapted to be actuated when the moving part of said equipment is stopped as said relay is de-energized.

It is a more specific object of this invention to provide an oscillatable member mounted adjacent a conveyor belt, a magnet mounted on said member, an electrical coil adapted to have said magnet oscillate within its field to produce an electrical current, a relay energized by said current and a circuit normally open comprising an electrical signal and adapted to be closed when said relay is de-energized as said conveyor belt is stopped, whereby said signal is put into operation.

With reference to the previous object, it is also an object of this invention to have a control circuit connected to said relay, said control circuit controlling the supply of current for operating the equipment involved including said conveyor belt, said control circuit being normally closed whereby said circuit is broken when said relay is de-energized by the stoppage of said conveyor belt.

These and other objects and advantages of the invention will be fully set forth in the following description made in connection with the accompanying drawings in which like reference characters refer to similar parts throughout the several views and in which.

Figure 1:
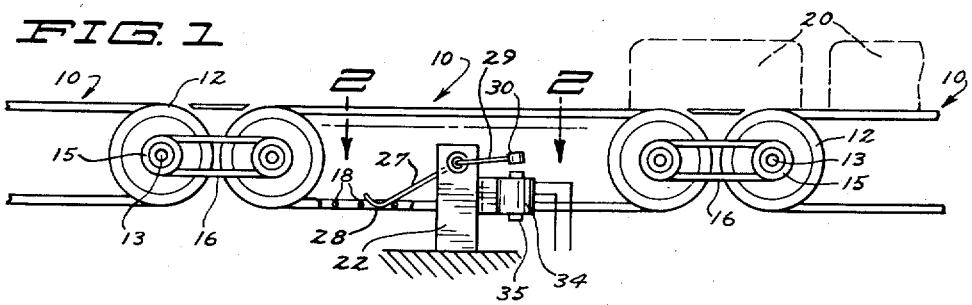
FIG. 1 is a diagrammatic view in side elevation.
Figure 2:
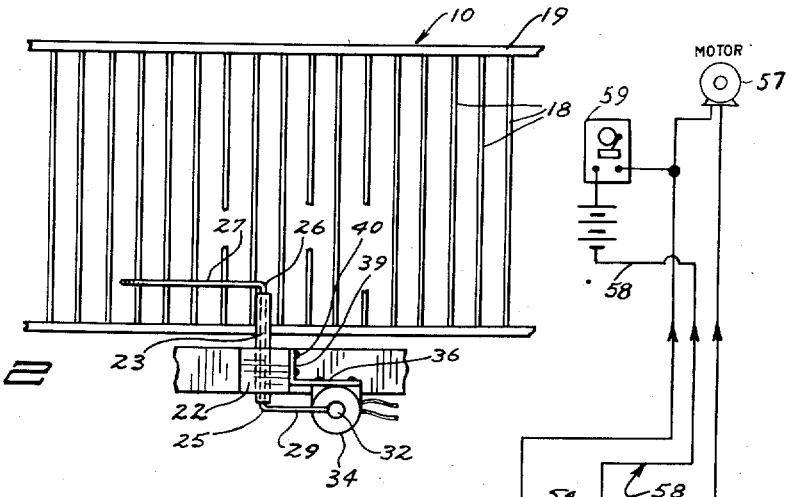
FIG. 2 is a top plan view of the central portion shown in FIG. 1.
Figure 3:
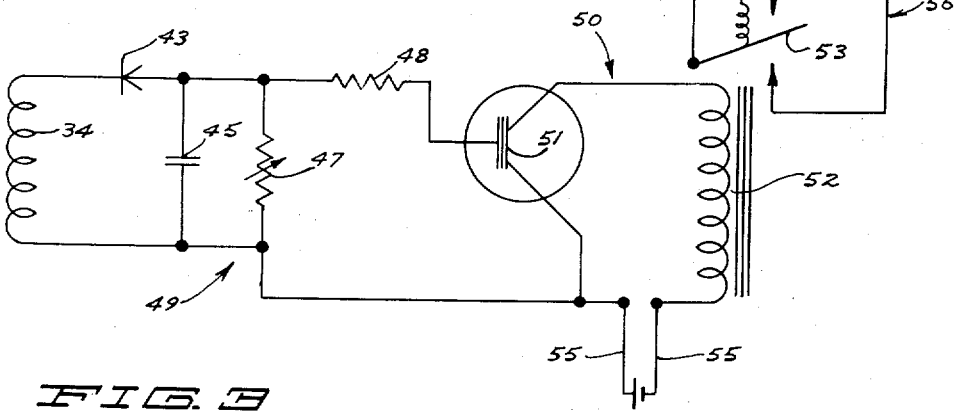
FIG. 3 is a wiring diagram in connection with applicant's device.

Referring to the drawings, applicant's invention is here shown in its present embodiment in a common type of installation. For purposes of illustration only a sufficient portion of equipment with which applicant's device is operatively associated is here shown to indicate said operative relationship.

Applicant's device may be adapted to be actuated by various moving parts of mechanical equipment, but as will be described is here shown in association with an endless conveyor belt. A plurality of endless belts 10 are shown passing over rollers 12 secured on shafts 13. Pulleys 15 are mounted at one end of said shafts 13. Passing over adjacent pairs of said pulleys 15 respectively at the adjacent ends of adjacent conveyor belts are belts 16. Preferably U belts are used and said pulleys 15 will be adapted to carry such belts.

Said endless conveyor belts 10 may be variously formed. Said belts 10 are here illustrated as being formed of spaced transversely extending slats 18 carried between outer side strip portions 19 adapted to have said slats secured therebetween. Said slats will be suitably spaced apart and will have a cross section dimension of some thickness. Shown being carried by said belts 10 are indications of goods 20.

While applicant's invention may be variously set up, it is here shown comprising a standard or post 22 mounted upright adjacent the centrally shown conveyor belt 10. Said post 22 is here shown to be rectangular in cross section and of a height somewhat above the lower run of said belt 10. Shown here extending through said post and extending inwardly over the adjacent edge portion of said belt 10 is a sleeve 23. Journaled in said sleeve is a member 25 here indicated as being formed of rod-like material. Said member 25 has a central portion 26 journaled in said sleeve 23 and has arms 27 and 29 at either end thereof and extending oppositely at right angles to said central portion 26.

Said arm 27 is shown having a rather sharp upwardly curved free end portion 28 adapted to rest on the lower run of said belt 10 and engage said slats 18. Said slats will be of sufficient dimension in cross section and will be spaced sufficiently apart to give said arm 27 substantial vertical movement upwardly and downwardly when said belt 10 is in motion and this in effect provides oscillation for said member 25.

Said arm 29 in the embodiment of the invention here illustrated will be at an angle somewhat above a horizontal position when said arm 29 has its end portion 28 at its lowest point of rest adjacent slats on belt 10. Said arm 29 is here indicated as having a bifurcated free end portion 30 and being preferably made of non-conductive material or caused to be non-conductive and will have mounted and secured therein a magnet 32. Said magnet may be suitably secured in position in said end portion 30 as by having grooved sides adapted to tightly receive in said grooves the respective sides of said bifurcated end portion.

Mounted on said post 22 in operative relationship with said arm 29 and said magnet 32 is an electrical pick-up coil 34 having a core 35. Said coil 34 is secured to a bracket 36 by screws 37 and said bracket is shown having a right angled end portion 39 secured to said post 22 by screws 40. Said coil 34 will be positioned in relation to said arm 29 and said magnet 32 whereby when said member 25 is oscillated by motion of said belt 10, said magnet 32 will oscillate within the field of said coil 34.

Connected to said pickup coil 34 is a diode 43. In the embodiment of the invention here illustrated, a germanium diode is indicated as being used. Said diode 43 will be adapted to rectify the A.C. current generated by the operative relationship between said magnet 32 and said rent will be converted into D.C. current. Said A.C. current will be converted into D.C. current. In circuit with said diode 43 and pickup coil 34 is a capacitor 45 adapted to level the impulses of current passing therethrough. The timing interval of said capacitor in leveling the impulses of current passing therethrough will vary with the size of the capacitor used. A variable resistor 37 is placed across said capacitor to adjust the effect of said capacitor to various variations in timing as may be desired and this arrangement permits a wide adaptability of said capacitor. A second resistor 48 is included in the circuit comprising said capacitor 45 and variable resistor 47.

Thus a control circuit 49 is provided producing a signal voltage.

Said signal voltage control circuit is connected to a power circuit 50. Said power circuit comprises a transistor 51, a relay coil 52 and a source 55 of D.C. operating current. A coil arm 53 is shown in connection with said relay coil 52. The amount of current provided from said D.C. source 55 will fall short of being sufficient to fully energize and actuate said relay coil 52. Said supply of D.C. current will be in an amount which when augmented by the current provided by the signal voltage control circuit 49 and as amplified by said transistor 51 will be just sufficient to fully energize and actuate said relay coil 52.

Said relay coil 52 is adapted to be connected to a motor control circuit 56 and to a signal control circuit 58. Said motor control circuit 56 will control the supply of current *to a motor 57* for the operation of equipment in connection with which applicant's device is used. Said signal control circuit 58 will be connected to an electrical signal device 59 here illustrated as a bell type of signal. Said signal device may consist of any commonly used audible or visual signal or a combination of both as may be suitable. The arm 53 of said relay coil 52 is adapted to engage a contact in circuit 56 or 58 in the alternative. Said arm will be caused to close said circuit 56 when said relay is energized. When said relay is de-energized, a spring 54 suitably anchored will cause said arm 53 to close said circuit 58.

In operation, when conveyor belt 10 is in motion, arm 27 will be moved upwardly and downwardly by the transverse slats which make up said belt. The free end portion 28 of said arm 27 will be bent upwardly at sharp enough an angle so that the magnet 32 carried at the outer end of arm 29 will be moved upwardly and downwardly, or in other words, oscillated within the field of the pickup coil 34. Said arms 27 and 29 will be positioned to bring about this operational relationship with said pickup coil 34. Thus an alternating current is generated by this operational relationship. As the current generated passes from said coil 34 it is rectified by the diode 43 and is converted into direct current. The capacitor 45 is provided to level the impulses passing therethrough to provide a level flow of current. The timing interval of said capacitor 45 in leveling said impulses of current will vary with the size of the capacitor used. The same will be adapted to the requirements of any particular installation. A variable resistor 47 is placed across said capacitor to adjust the timing of the impulses to permit a wide adaptability of said capacitor and the control effected by said variable resistor will be directly related to the type of the relay coil 52 which is used. There is a substantial degree of flexibility between the elements which make up the applicant's control system.

The elements above described, except for the relay coil and including a second resistor 47 which may be used and which is here shown as being used, make up the applicant's signal voltage control circuit. The current from this circuit will pass through a transistor 51 which will be adapted to amplify the current sufficiently for the purpose required. Said transistor 51 and said relay coil 52 comprise a power circuit 50 which is provided with a source 55 of direct current. Said supply of direct current will be insufficient to fully energize and actuate the relay coil 52. The current provided by the signal voltage control circuit when added to that from source 55 will make up a total load of current which will be required to fully energize and actuate said relay coil 52. When fully energized said relay coil 52 will draw the coil arm 53 downwardly to complete a circuit 56 which is designated as a motor control circuit. This circuit when closed will permit the operation of the equipment involved, a portion of which will be the conveyor belts 10. In the embodiment of applicant's invention as here illustrated and disclosed, the only portion of the equipment which is directly connected to the applicant's device is the conveyor belt 10 and this essential in the operation of applicant's device.

Thus it is seen that the supply of current provided by applicant's signal voltage control circuit and the amount from source 55 must be just sufficient to operate relay coil 52. The total load must be accurately determined so that if there is any diminution in the amount supplied by applicant's signal voltage control circuit, said relay coil will be sufficiently de-energized so that it will be incapable of holding arm 53 down whereby said arm will respond to the pull of spring 54 and be moved upwardly to complete circuit 58 which is a signal control circuit.

The instant that arm 53 breaks away from circuit 56 and completes circuit 58, the power supply to all of the equipment involved will be instantly cut off and a suitable signal will be actuated to draw attention to the fact that there is a stoppage of a conveyor belt. A complete stoppage will not necessarily be required. This setup can be so adapted so that a sufficient slowdown in a conveyor belt will bring about the same result. Thus it is seen that the moment that a stoppage or a slowdown occurs at whatever point the applicant's device is installed, notice of such condition will be given at once and simultaneously and automatically the power supply is cut off to prevent any damage to equipment or to motors which may be supplying the power for the operation of the equipment.

Although only one signal control circuit for providing signal voltage is here described, any number of such circuits may be used in connection with a single power circuit, such as the circuit 50. Hence there may be any desired number of control points at which the applicant's magnet 32 and pickup coil 34 may be installed together with the rest of the circuit of which these elements are a part. Each of these circuits thus provides its own specific supply of energy by generating the same. These will be adapted one in relation to another so that the total load of current of each of said circuits together with the supply 55 provided directly to a power circuit 50 will form a total load of current just sufficient to energize and actuate relay coil 52.

The operation and maintenance of applicant's control device is very simple, is made up of very few parts which are long lasting and require very little care or maintenance. The system is unaffected by temperature changes or other atmospheric conditions. It is very simple to connect the signal voltage control circuits, such as circuit 49, with a power circuit, such as circuit 50. Although a conveyor belt is shown here as an actuating member for arm 27, the same result may be brought about by having said arm 27 actuated by a cam secured to a shaft, such as a shaft 13.

Thus it is seen that I have provided a very simple automatic equipment protective device which has wide adaptability, is relatively simple and inexpensive to install and which provides carefree and reliable performance. An essential and novel element of applicant's device is that it of itself generates the current necessary to effect the desired control over the operation of equipment involved.

[It will of course be understood that various changes may be made in the form, details, arrangement and proportions of the device and in the steps and sequence of steps of the method without departing from the scope of applicant's invention, which, generally stated, consists in a method and device capable of carrying out the objects above set forth, such as disclosed and defined in the appended claims.]

*It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.*

What is claimed is:

1. An automatic equipment protective device having in combination, a belt, a supporting member adjacent said belt, an arm bearing member journaled in said supporting member having one arm adapted to be engaged by said belt and oscillated thereby, a second arm adapted to be oscillated by said first arm, a magnet carried at the free end of said second arm, an electrical coil having a core therein mounted on said supporting member in an operative relationship to said magnet, a rectifier connected to said coil, a capacitor connected to said rectifier to provide a level flow of current, a variable resistor placed across said capacitor to adjust the timing interval of said capacitor whereby a control circuit is provided producing a [single] *signal* voltage when said belt is in operation.

2. The structure set forth in claim 1, a power circuit in connection with said control circuit comprising a transistor, a relay coil and a source of D.C. current, said current being just short a certain amount of being sufficient to fully energize and actuate said relay coil, said control circuit being adapted to provide said certain amount of current which in addition to the current in said power circuit is sufficient to actuate said relay coil, said power circuit with said control circuit energized normally communicates with a motor control circuit for doing work and continuing the operation of said belt, a signal circuit, said power circuit having communication with said signal circuit to actuate a signal device when said belt becomes inoperative, and said control circuit is deenergized whereby current is cut off from *said motor control circuit to discontinue the operation of* said belt.

3. An automatic equipment protective device having in combination, a belt, a supporting member adjacent said belt, an arm bearing member journaled in said supporting member, one arm of said last mentioned member being adapted to be oscillated by said belt, a second arm on said arm bearing member adapted to be oscillated by said first arm, a magnet carried by said second arm, a coil about a core mounted adjacent said magnet with said magnet being adapted to be oscillated into the field about said coil, a rectifier connected to said coil, a capacitor connected to said rectifier to supply a level flow of current, a variable resistor placed across said capacitor to adjust the timing interval thereof to provide a control circuit producing a predetermined signal voltage whereby the oscillation of said magnet within the field of said coil results in the production of a D.C. current, a power circuit in connection with said control circuit having a source of D.C. current by means of which said power circuit is normally energized, said power circuit comprising a relay coil, a motor control circuit for the operation of said belt a spring actuated contact for connection between said relay coil and said motor control circuit, said power circuit in connection with said control circuit normally actuating said relay coil to energize said motor control circuit by means of said spring actuated contact, a signal circuit said spring actuated contact being adapted to connect said power circuit and said signal circuit when said control circuit is deenergized by the stoppage of said belt whereby when said belt becomes inoperative and said signal voltage fails, said relay coil becomes deenergized and said spring actuated contact being released from said coil connects said power circuit and said signal circuit, and a signal device adapted to be actuated by said signal circuit.

*4. An automatic equipment protective device having in combination, an operating mechanism, a magnet stationarily positioned and mechanically actuated by said mechanism, a supporting member for said magnet, an electrical coil having a core therein mounted on said supporting member in an operative relationship to said magnet, a rectifier connected to said coil, a capacitor connected to said rectifier to provide a level flow of current, a variable resistor placed across said capacitor to adjust the timing interval of said capacitor whereby a control circuit is provided producing a signal voltage when said mechanism is in operation.*

*5. The structure set forth in claim 4, a power circuit in connection with said control circuit comprising a transistor, a relay coil and a source of D.C. current, said current being just short of a certain amount of being sufficient to fully energize said relay coil, said control circuit providing said certain amount of current which in addition to the current in said power circuit is sufficient to energize said relay, said power circuit with said control circuit energized normally communicates with a motor control circuit for doing work and continuing the operation of said mechanism, a signal circuit, said power circuit having communication with said signal circuit to actuate a signal device when said mechanism becomes inoperative, and said control circuit is deenergized whereby current is cut off from said mechanism.*

*6. An automatic equipment protective device having in combination, an operating mechanism, a magnet stationarily positioned and mechanically actuated by said mechanism, a supporting member for said magnet, an electrical coil carried by said supporting member, said magnet being actuated by said mechanism to have an inductive relationship with said coil, a rectifier connected to said coil, a capacitor connected to said rectifier to provide a level flow of current, a variable resistor placed across said capacitor to adjust the timing interval of said capacitor whereby a control circuit is provided producing a signal voltage when said mechanism is in operation.*

References Cited in the file of this patent or the original patent

UNITED STATES PATENTS

| | | |
|---|---|---|
| 2,142,880 | Anderson et al. | Jan. 3, 1939 |
| 2,775,753 | Kennedy | Dec. 25, 1956 |
| 2,792,106 | Fredh et al. | May 14, 1957 |
| 2,808,581 | Findlay | Oct. 1, 1957 |